UNITED STATES PATENT OFFICE.

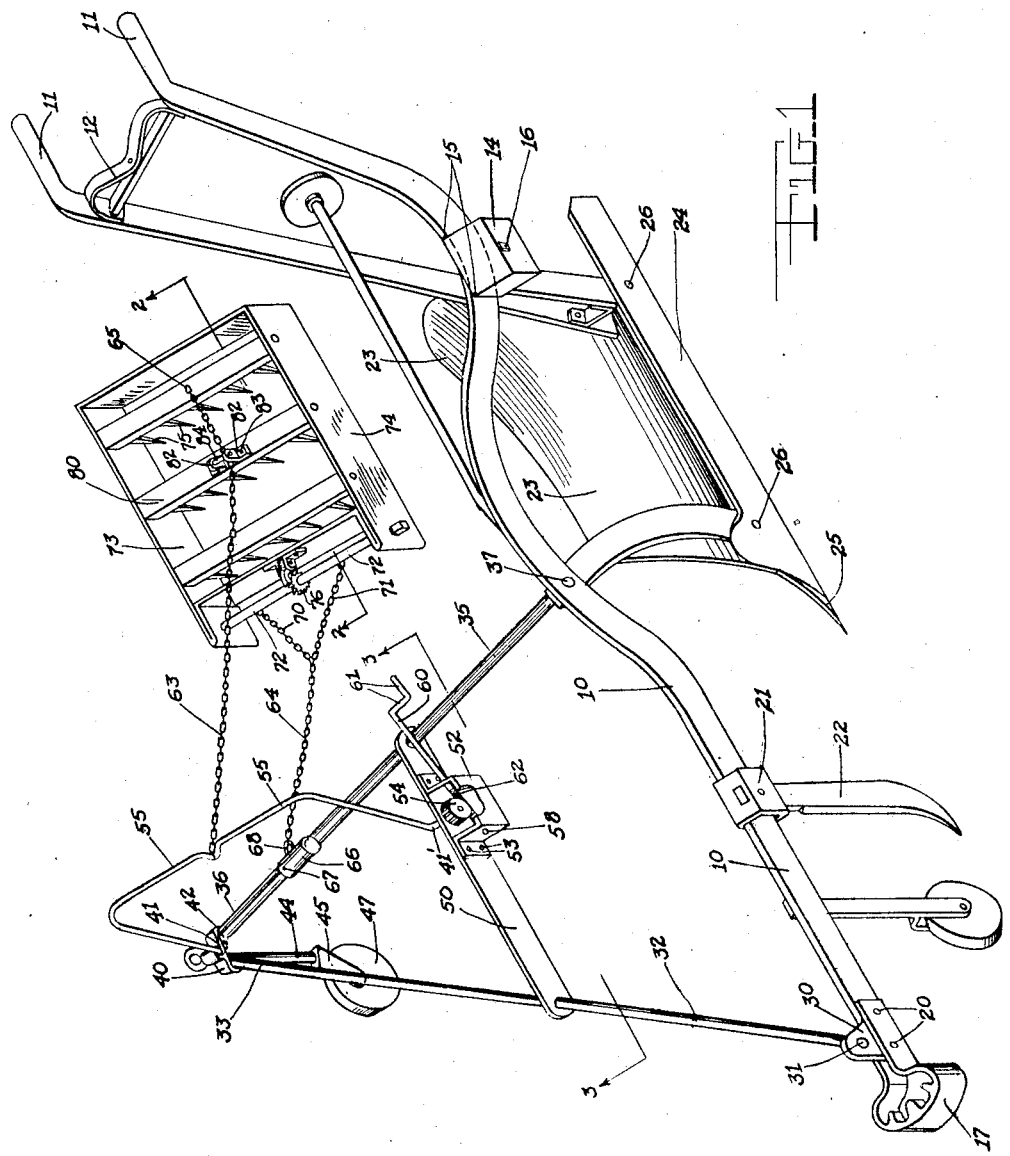

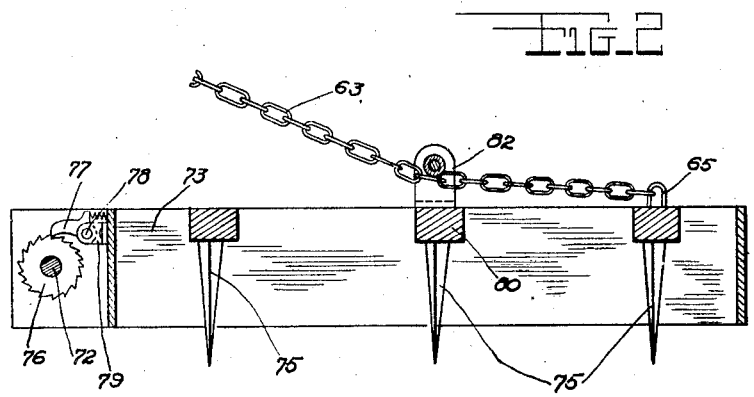
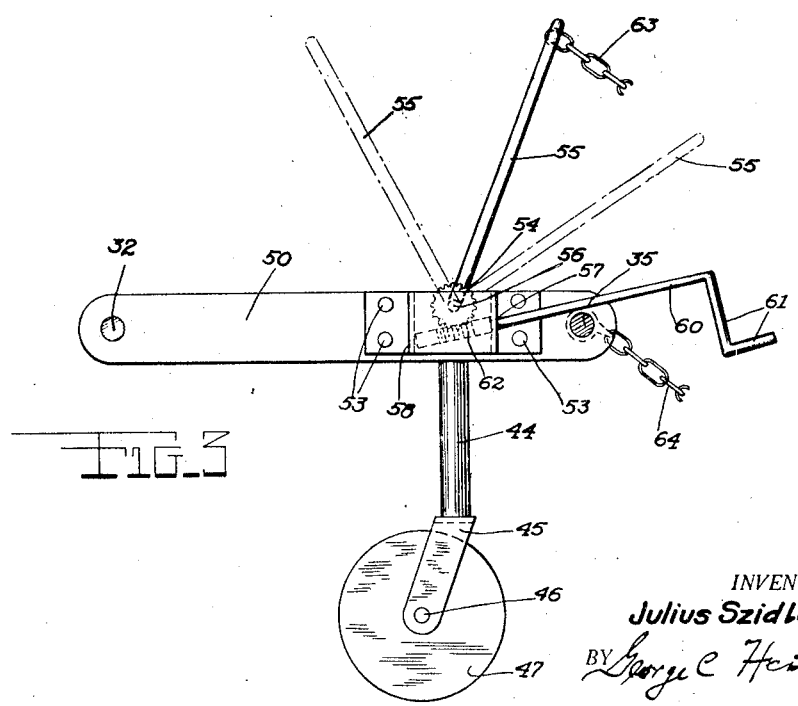

JULIUS SZIDLAUSKAS, OF CHICAGO, ILLINOIS.

PLOW.

1,359,630.

Specification of Letters Patent. Patented Nov. 23, 1920.

Application filed November 8, 1919. Serial No. 336,635.

*To all whom it may concern:*

Be it known that I, JULIUS SZIDLAUSKAS, a citizen of Russia, residing at Chicago, county of Cook, and State of Illinois, have invented certain new and useful Improvements in Plows, of which the following is a specification.

This invention has as its object the provision of means whereby a harrow may be attached to a plow in such a manner as to perform the operation of harrowing or leveling the ground at the same time it is being plowed.

This object is attained by the novel construction and combination of parts hereinafter described and shown in the accompanying drawings, forming a material part of this disclosure, and in which—

Figure 1 is a perspective view of a plow and harrow made in accordance with the invention.

Fig. 2 is a cross sectional view of the harrow taken on line 2—2 of Fig. 1, and, Fig. 3 is a cross sectional view of the attaching means, taken on line 3—3 of Fig. 1.

Referring to the drawings in detail, the numeral 10 designates the beam of an ordinary plow, to which are attached the guiding handles 11, having a brace 12 secured therebetween, and on the side of one of the guiding handles 11 is a small box 14, secured by screws 15, the box having a lock or catch 16, to secure in any articles it may contain.

At the forward end of the beam 10 is a clevis 17, secured by screws 20, to which the draft animal or animals which are to draw the plow are harnessed.

At the rear of the clevis 17, extending from the beam 10, is a bracket 21 having a steel blade or colter 22 attached in the usual manner.

A mold board 23, has at the bottom thereof a land side 24, and secured therein is a shaft 25 of steel or chilled castiron properly shaped to rip open the ground, the share being secured by screws 26, all of these elements being attached to the beam 10 in the usual manner.

Secured between the clevis 17 and the beam 10 is a plate 30 having a hole 31 from which a rod 32 extends at an angle so as to engage the end 33 with another rod 35 which extends from the crossing point where it is secured within a hole 37 in the plow beam 10.

The end 36 of the rod 35 is engaged by a yoke clamp 40, the clamp engaging the two rod ends 33 and 36 and also another turned rod end 41 which is pivotally engaged within a hole 42 in the clamp 40.

Extending downward from the clamp 40 is still another rod 44, and secured at its end is a fork 45, carrying an axle 46 upon which is rotatably mounted a trailer wheel 47 which rests upon the ground and rotates as the plow is drawn forward.

A brace bar 50 is secured between the two rods 32 and 35 and has a square casing 52, secured by screws 53. In the casing 52 is a worm wheel 54 fixedly engaged upon the turned end 41′ of a bent rod 55, the rod end 41′ entering within a hole 56 in the bar 50.

Passing through a hole 57, and engaged within another hole 58, in the casing 52, is another rod 60 having a crank handle 61 at its outer end, and at the inner end a worm 62 with which the worm wheel 54 meshes.

As the crank handle 61 is turned, the worm 62 turns the worm wheel 54, which is fixed upon the rod end 41′, thereby turning the rod 55 into an upward position. As the rod 55 is moved upward it pulls the chain 63, which is attached at one end to a loop or indentation at the center of the rod 55, the other end of the chain being fixedly engaged to the harrow by a staple 65.

A chain 64 is attached at one end to the rod 35 by a sleeve 66 secured by a set screw 67. The sleeve 66 has a ring 68 to which the chain 64 is secured.

The other end of the chain 64 has two branches 70 and 71, each being secured to a roller 72 which is rotatably mounted between the side boards 73 and 74 of the harrow, comprised of pieces of timber or metal and set with teeth 75.

Fixedly engaged upon the roller 72 is a ratchet wheel 76, having a spring impelled pawl 77 engaging the wheel, the pawl 77 being rotatably mounted upon a pin 78 which is fixedly engaged between two brackets 79.

Attached above one of the pieces of timber 80 are two angular plates 82 secured by screws 83. Engaged between the two plates 82 is another rotatably mounted roller 84, under which the chain 63 passes, prior to attachment to the staple 65.

From the foregoing it will be seen that a neat appearing and cheaply constructed plow has been disclosed, to which a harrow may be attached in a manner which will be clearly understood, thereby providing a farm implement that at one operation performs the united operation of plowing and harrowing in an effective manner.

Having thus described my invention what I claim as new and desire to secure by Letters Patent, is—

1. A plow attachment of the character described including means for attaching a harrow to the plow, comprising a pair of converging rods, a yoke clamp connecting the meeting ends of said rods, a brace bar between both rods, a casing secured to said bar, a rod having an indentation centrally thereof to form a crank, a sleeve fixedly secured to one of said converging rods, chains for attaching the harrow to the indentation of said rod and to said sleeve, and means for operating said bent rod for tilting the harrow at an angle.

2. A plow attachment of the character described including means for attaching a harrow to the plow, comprising a pair of converging rods, a yoke clamp connecting the meeting ends of said rods, a brace bar between both rods, a casing secured to said bar, a bent rod having an indentation centrally thereof to form a crank and secured with one end to said yoke and with the other to said brace bar, means for attaching the harrow secured to the indentation of said bent rod and to one of said converging rods, a worm wheel on the end of said bent rod, a crank handle having a worm at its inner end meshing with said worm wheel for operating said bent bar to tilt the harrow at an angle.

In testimony whereof I have affixed my signature.

JULIUS SZIDLAUSKAS.